2,720,539

REFINING NAPHTHENIC ACIDS

Samuel E. Jolly, Ridley Park, Pa., assignor to Sun Oil Company, Philadelphia, Pa., a corporation of New Jersey No Drawing. Application June 15, 1954,
Serial No. 437,007

3 Claims. (Cl. 260—514)

The invention relates to the refining of petroleum naphthenic acids and more particularly to the obtaining of naphthenic acids having good color and color stability and low bromine number.

It is known in the art to recover petroleum naphthenic acids from various mineral oil fractions, and the naphthenic acids thus recovered are particularly useful in numerous applications. One difficulty which arises however, at least with some naphthenic acids, is the poor color of the acids. It is possible by distillation of naphthenic acids to obtain distillate cuts having good color but it frequently happens that the distillate cuts will rapidly darken under ordinary atmospheric conditions until the acids are again as dark, or nearly so, as the original charge to the distillation. Thus obtaining of good color in naphthenic acids in some cases may not be a particularly difficult problem, but obtaining good color stability is a very difficult problem.

Another problem which may arise in naphthenic acid production is reduction of the bromine number (A. S. T. M. 875–46T) to a level satisfactory for the use, for example, of soaps of the acids as emulsifying agents in emulsion polymerization of butadiene compounds.

Numerous methods have been proposed in the prior art for the refining of petroleum naphthenic acids, but most or all of these methods have been subject to some disadvantages. It is known for example to treat naphthenic acids with aqueous sulfuric acid, and some improvement in the naphthenic acids can be obtained in this fashion. However, sulfuric acid treatment has a serious disadvantage in that large amounts of viscous and tarry sludge are formed and this sludge creates a difficult handling problem. Thus the sludge is difficult to separate from the naphthenic acids, and in subsequent distillation of the naphthenic acids, if the sludge has not been substantially completely separated, the presence of residual sludge will cause the distillates to have poor color. These disadvantages of sulfuric acid treatment are particularly pronounced in the case of lubricating oil naphthenic acids, e. g. those having saponification number lower than 190 mg. of KOH per gram.

According to the present invention a method for refining petroleum naphthenic acids is provided which is free of the difficulties encountered in sulfuric acid treatment and which is capable of producing naphthenic acid products having good color and also good color stability. The treatment according to the invention involves the use of sulfamic acid, $SO_2(OH)NH_2$. This treating agent is a normally solid material, and is according to one embodiment of the invention, contacted with naphthenic acids in the substantially anhydrous, solid state. After the treatment, the solid sulfamic acid can be separated from the naphthenic acids in any suitable manner, e. g. by filtration or by extraction of the sulfamic acid with water, etc.

The treatment according to the invention does not result in the formation of any substantial amount of sludge, and whatever sludge is formed is readily removed from the naphthenic acids by a simple filtration, preferably in the presence of an added diluent such as petroleum naphtha. The filtered naphthenic acids can then be vacuum distilled to obtain distillates having good color and color stability. Such distillation is generally essential to obtaining good color and color stability, but in cases where bromine number reduction alone is required, such distillation may be unnecessary.

The treatment with sulfamic acid according to the invention is conducted at a temperature of generally at least about 75° C., and preferably within the approximate range from 100° C. to 200° C. Higher temperatures may be used if desired, though generally the desired results can be obtained without resorting to such higher temperatures. Furthermore, temperatures below 200° C. appear to favor the obtaining of products having good color and color stability. The amount of sulfamic acid used, on the anhydrous basis, is preferably within the range from 0.1 to 10 parts of sulfamic acid by weight per 100 parts of naphthenic acids, though larger amounts can be used if desired. Preferred conditions for reducing bromine number involve the use of a temperature of at least about 120° C. for a time of at least about an hour.

The following examples illustrate the process of the invention:

*Example 1*

Naphthenic acids having saponification number of 160.7 mg. of KOH per gram were recovered from petroleum lubricating oil by a process involving distilling a reduced crude, contacting the vapors with caustic soda to form sodium naphthenates, recovering sodium naphthenates from the caustic soda and de-oiling the naphthenates by extraction with petroleum naphtha in the presence of aqueous isopropanol. The naphthenic acids obtained by acidifying the thus recovered naphthenates were distilled to obtain a 0–65% distillate which was not subjected to any further treatment prior to the sulfamic acid refining according to the invention. 5 parts by weight of sulfamic acid in powder form were admixed with 95 parts by weight of the naphthenic acid distillate obtained as described, and the mixture was heated with agitation for a period of about one hour at a temperature increasing from room temperature to 150° C. during the hour. The mixture was then diluted with petroleum naphtha and filtered to remove excess sulfamic acid and any sludge that may have been formed. No difficulties were encountered in the filtration. The filtrate was water washed and naphtha was stripped therefrom. Then the naphtha-free filtrate was distilled under vacuum to obtain a 0 to 50% cut having NPA color of 2+. The color stability of this fraction was tested by heating it to 150° F. for 72 hours, at the end of which time the color had increased to 5. By way of comparison a 0 to 50 percent cut of the untreated original naphthenic acid distillate turned completely black in 72 hours under the same conditions.

The following table shows the results obtained:

| | Initial NPA Color | NPA Color after 72 hours at 150° F. |
|---|---|---|
| Untreated Acids | 3 | Black |
| Sulfamic-Acid Treated Acids | 2+ | 5 |

This example shows that the color stability of lubricating oil naphthenic acids can be considerably improved by sulfamic acid, and that the use of sulfamic acid as refining agent presents no difficult problems with regard to handling as in the prior art treatment with sulfuric acid.

Example II

Petroleum naphthenic acids having saponification number of 163.9 mg. of KOH per gram, bromine number of 9.2 and NPA color of 4 were used as starting material. 5 parts by weight of anhydrous sulfamic acid were mixed with 100 parts by weight of these acids and the mixture was stirred for 2 hours at 150° C. The mixture was then diluted with naphtha, and the sulfamic acid and any sludge formed were filtered from the naptha-diluted acids. The acids, after removal of naphtha, were found to have a saponification number of 159.8 and bromine number of 5.2. A 0–70% distillate from the latter naphthenic acids was found to have saponification number of 189.1, bromine number of 4.4 and NPA color of 2½. After aging for 24 hours at 150° F. the acids were found to have NPA color of 4.

Another portion of the same starting material was distilled to obtain a 0–70% distillate, which was found to have saponification number of 187.3, bromine number of 9, and NPA color of 3½. After aging for 24 hours at 150° F. the acids were found to have NPA color of 8.

The following table shows a comparison of the results obtained:

|  | Bromine No. | NPA Color |
|---|---|---|
| Untreated Naphthenic Acids | 9.2 | 4 |
| Untreated Acids, 0–70% Distillate | 9.0 | 3½ |
| Untreated Acids, 0–70% Distillate, Aged |  | 8 |
| Treated Acids | 5.2 |  |
| Treated Acids, 0–70% Distillate | 4.4 | 2½ |
| Treated Acids, 0–70% Distillate, Aged |  | 4 |

This example shows that treatment with anhydrous sulfamic acid for two hours at 150° C. produces a substantial reduction of bromine number of the acids, i. e. from 9.2 to 5.2, and that a distillate from the treated acids has substantially better color and color stability than the corresponding distillate from the untreated acids.

It is preferred, according to the invention, to use substantially anhydrous sulfamic acid as treating agent. Aqueous solutions of sulfamic acid can be used, but at reflux temperature, in the case of a 10% solution for example, the extent of bromine number reduction and color and color stability improvement obtained is decidedly inferior to that obtained with a corresponding amount of anhydrous sulfamic acid at 150° C.

The invention claimed is:

1. Method for refining petroleum naphthenic acids which comprises: contacting petroleum naphthenic acids with sulfamic acid at a temperature of at least 75° C.

2. Method for refining lubricating oil naphthenic acids obtained from petroleum and having a saponification number less than 190 mg. of KOH per gram which comprises: contacting 100 parts of such naphthenic acids with 0.1 to 10 parts by weight of sulfamic acid in anhydrous condition, at a temperature within the approximate range from 100° C. to 200° C.; filtering the resulting mixture; and distilling the filtrate to obtain naphthenic acid distillate fractions.

3. Method for refining petroleum naphthenic acids which comprises contacting 100 parts of petroleum naphthenic acids with 0.1 to 10 parts by weight of sulfamic acid in anhydrous condition, at a temperature of at least 75° C.

No references cited.